United States Patent
Shen et al.

(10) Patent No.: US 11,340,555 B2
(45) Date of Patent: May 24, 2022

(54) ADJUSTABLY MULTIFOCAL 3D HOLOGRAPHIC DISPLAY SYSTEM

(71) Applicant: Himax Display, Inc., Tainan (TW)

(72) Inventors: Che-Yung Shen, Tainan (TW); Shang-Hao Huang, Tainan (TW); Shang-Ting Wu, Tainan (TW); Shuo-En Lin, Tainan (TW); Yi Cheng, Tainan (TW); Yi-Pai Huang, Tainan (TW); Chi-Wen Lin, Tainan (TW)

(73) Assignee: Himax Display, Inc., Tainan (TW)

( * ) Notice: Subject to any disclaimer, the term of this patent is extended or adjusted under 35 U.S.C. 154(b) by 476 days.

(21) Appl. No.: 16/548,580

(22) Filed: Aug. 22, 2019

(65) Prior Publication Data

US 2021/0055688 A1 Feb. 25, 2021

(51) Int. Cl.
*H04N 13/363* (2018.01)
*G03H 1/04* (2006.01)
(Continued)

(52) U.S. Cl.
CPC ........... *G03H 1/04* (2013.01); *G02B 27/0101* (2013.01); *G02B 27/0103* (2013.01); *G03H 1/02* (2013.01);
(Continued)

(58) Field of Classification Search
CPC .... G02B 2027/0109; G02B 2027/0174; G02B 27/0101; G02B 27/0103; G02B 27/0172; G03H 1/02; G03H 1/04; G03H 1/0808; G03H 1/2205; G03H 1/2294; G03H 2001/0224; G03H 2001/0439; G03H 2001/0816; G03H 2001/2207;
(Continued)

(56) References Cited

U.S. PATENT DOCUMENTS

| 2011/0149018 A1* | 6/2011 | Kroll | ................. G03H 1/02 |
| | | | 445/24 |
| 2013/0120813 A1* | 5/2013 | Cowling | ............. G03F 7/703 |
| | | | 359/9 |

(Continued)

FOREIGN PATENT DOCUMENTS

| CN | 102542581 A | 7/2012 |
| TW | 200935197 A | 8/2009 |

OTHER PUBLICATIONS

Kyoji Matsushima et al., "Band-Limited Angular Spectrum Method for Numerical Simulation of Free-Space Propagation in Far and Near Fields", Optics Express, OSA Publishing, vol. 17, No. 22, Oct. 2009, pp. 19662-19673.

(Continued)

*Primary Examiner* — Ram A Mistry
(74) *Attorney, Agent, or Firm* — Donald E. Stout; Stout, Uxa & Buyan, LLP (57) ABSTRACT

A three-dimensional (3D) holographic display system includes a projector that generates an image with a form of spatially varying modulation on a light beam; holographic processor that performs a holographic method on the image generated by the projector; and memory device that stores holographic data generated in a process of performing the holographic method by the holographic processor. An amplitude of a light field is adaptively replaced by the holographic processor according to significance of respective areas of the image.

15 Claims, 7 Drawing Sheets

(51) Int. Cl.
*G03H 1/02* (2006.01)
*H04N 5/74* (2006.01)
*G06T 5/50* (2006.01)
*H04N 9/31* (2006.01)
*G06T 19/20* (2011.01)
*G02B 27/01* (2006.01)
*H04N 5/89* (2006.01)
*H04N 13/275* (2018.01)

(52) U.S. Cl.
CPC .............. *G06T 5/50* (2013.01); *G06T 19/20* (2013.01); *H04N 5/7441* (2013.01); *H04N 5/89* (2013.01); *H04N 9/315* (2013.01); *H04N 9/3179* (2013.01); *H04N 13/275* (2018.05); *H04N 13/363* (2018.05); *G02B 27/0172* (2013.01); *G02B 2027/0109* (2013.01); *G02B 2027/0174* (2013.01); *G03H 2001/0224* (2013.01); *G03H 2001/0439* (2013.01); *G03H 2223/24* (2013.01); *G03H 2225/13* (2013.01); *G06T 2200/04* (2013.01)

(58) Field of Classification Search
CPC ... G03H 2001/2252; G03H 2001/2284; G03H 2210/20; G03H 2210/33; G03H 2223/24; G03H 2225/13; G06T 19/20; G06T 2200/04; G06T 5/50; H04N 13/275; H04N 13/363; H04N 5/7441; H04N 5/89; H04N 9/315; H04N 9/3179
See application file for complete search history.

(56) References Cited

U.S. PATENT DOCUMENTS

| | | | | |
|---|---|---|---|---|
| 2015/0346491 | A1* | 12/2015 | Christmas | G03H 1/0808 359/9 |
| 2017/0045859 | A1* | 2/2017 | Christmas | G03H 1/2294 |
| 2020/0192287 | A1* | 6/2020 | Chakravarthula | G03H 1/0866 |

OTHER PUBLICATIONS

Extended European Search Report dated Jan. 26, 2021 in related European Application No. 20178186.1.

Kyoji Matsushima et al., "Band-Limited Angular Spectrum Method for Numerical Simulation of Free-Space Propagation in Far and Near Fields," Optical Society of America, vol. 17, No. 22, Oct. 26, 2009.

Kyoji Matsushima et al., "High-definition full-parallax CGHs created by using the polygon-based method and the shifted angular spectrum method," Proc. SPIE 7619, Practical Holography XXIV: Materials and Applications, 761913 (Feb. 10, 2010); doi: 10.1117/12.844606.

Richard P. Muffoletto et al., "Shifted Fresnel diffraction for computational holography," Optical Society of America, vol. 15, No. 9, Apr. 30, 2007.

Che-Yung Shen, et al., "Image Enhancement of 3D Holographic Head-Up Display Using Multi-Constraints Angular Spectrum Algorithm," SID International Symposium, Digest of Technical Papers, vol. 50, No. 1, Jun. 2019.

Extended European Search Report dated Oct. 26, 2020 in related European Application No. 20178186.1.

Office Action dated Jul. 9, 2020 in corresponding Taiwan Patent Application No. 108131341.

* cited by examiner

ADJUSTABLY MULTIFOCAL 3D HOLOGRAPHIC DISPLAY SYSTEM

BACKGROUND OF THE INVENTION

1. Field of the Invention

The present invention generally relates to a display, and more particularly to methods adaptable to a 3D holographic display.

2. Description of Related Art

A hologram is an image that appears to be three dimensional and can be seen with the naked eye, and holography is the practice of making holograms. Generally speaking, the hologram is a photographic recording of a light field, which is a vector function that describes the amount of light flowing in every direction through every point in space.

A head-up display (HUD) is a transparent display that presents data without requiring users to look away from their usual viewpoints. Holography may be adapted as a projector to the HUD to display a three-dimensional (3D) image.

Algorithms conventionally adopted in computer-generated hologram (CGH) may be divided into two categories: direct methods and inverse methods. The direct methods such as Direct method (DS), Simulated annealing (SA) and Genetic algorithm (GA), which compute pixel by pixel, can achieve high-accuracy imaging but require long computation time. On the other hand, the inverse methods such as Gerchberg-Saxton algorithm (GSA) and Iterative Fourier transform algorithm (IFTA), which perform iterative methods, can substantially reduce computation time but achieve low-accuracy imaging.

Conventional HUDs have a single fixed focus, and are thus disadvantageously limited in applications that require displaying images at different viewing distances. A need has thus arisen to propose a novel scheme that is adjustably multifocal, requires less computation time and possesses enhanced image quality compared to the conventional HUDs.

SUMMARY OF THE INVENTION

In view of the foregoing, it is an object of the embodiment of the present invention to provide a three-dimensional (3D) holographic display system that is adjustably multifocal, requires less computation time and possesses enhanced image quality.

According to one embodiment, a three-dimensional (3D) holographic display system includes a projector, a holographic processor and a memory device. The projector generates an image with a form of spatially varying modulation on a light beam. The holographic processor performs a holographic method on the image generated by the projector. The memory device stores holographic data generated in a process of performing the holographic method by the holographic processor. An amplitude of a light field is adaptively replaced by the holographic processor according to significance of respective areas of the image.

According to another embodiment, a first virtual image generated by an angular spectrum method is displayed in near field from a viewer, while a second virtual image generated by a Fresnel diffraction method is displayed in far field from the viewer.

DETAILED DESCRIPTION OF THE INVENTION

Figure 1:
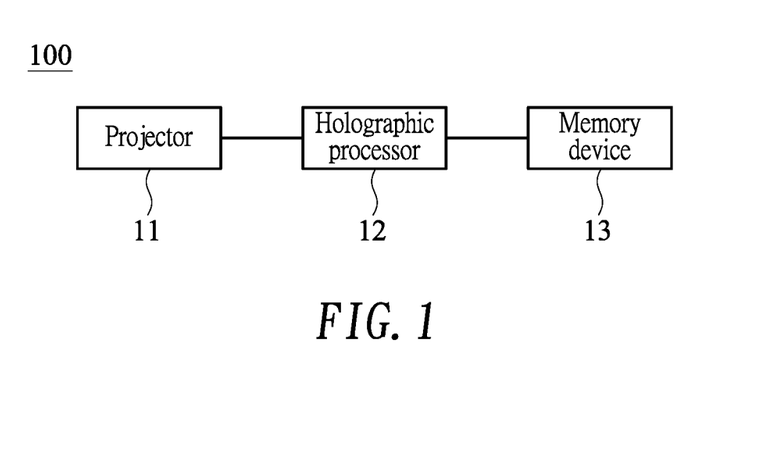
FIG. 1 shows a block diagram illustrating a three-dimensional (3D) holographic display system according to one embodiment of the present invention.

FIG. 1 shows a block diagram illustrating a three-dimensional (3D) holographic display system 100, which is an adjustably multifocal system, according to one embodiment of the present invention. In the embodiment, the 3D holographic display system 100 ("display system" hereinafter), such as a head-up display (HUD) or a head-mounted display, may include a projector 11, for example, a spatial light modulator (SLM), configured to generate an image with a form of spatially varying modulation on a light beam. In one example, the SLM may include a liquid crystal on silicon (LCOS) display.

The display system 100 of the embodiment may include a holographic processor 12, such as an image processor, configured to perform holographic methods on the image generated by the projector 11 to be disclosed in details later in this specification. The display system 100 of the embodiment may include a memory device 13, such as dynamic random-access memory (DRAM) or static random-access memory (SRAM), configured to (temporarily) store holographic data generated in the process of performing the holographic methods by the holographic processor 12. The display system 100 of the embodiment may include other optical setup, which will be described in details later in this specification.

Figure 2:
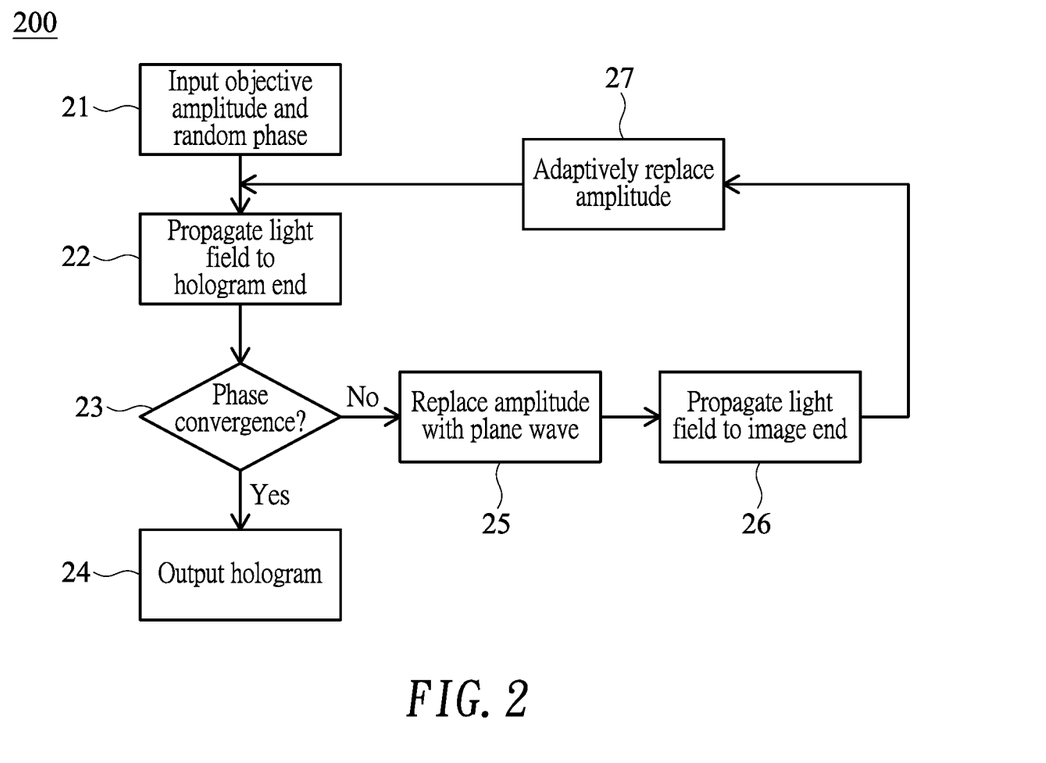
FIG. 2 shows a flow diagram illustrating a multi-constraints angular spectrum method according to one embodiment of the present invention adaptable to the 3D holographic display system of FIG. 1.

FIG. 2 shows a flow diagram illustrating a multi-(amplitude) constraints angular spectrum method 200 according to one embodiment of the present invention adaptable to the 3D holographic display system 100 of FIG. 1. It is noted that the embodiment adopts an inverse method capable of substantially reducing computation time, utilizes a multi-constrains scheme to substantially enhance image quality, and employs an angular spectrum method to remove zero-order diffraction and to provide multifocal function.

Specifically, in step 21, an objective amplitude and a random phase are inputted as a light field at an image end. Next, in step 22, the light field is propagated to a hologram end by using an angular spectrum (AS) method which is a convolution-based method, details of which may be referred to "Band-Limited Angular Spectrum Method for Numerical Simulation of Free-Space Propagation in Far and Near Fields," entitled to Kyoji Matsushima et al., published in 2009 Optics Express, and "High-definition full-parallax CGHs created by using the polygon-based method and the shifted angular spectrum method," entitled to Kyoji Matsushima et al., published in 2010 SPIE (Society of Photo-Optical Instrumentation Engineers) OPTO, the disclosures of which are incorporated herein by reference.

In step 23, it is determined whether a phase of the propagated light field achieves convergence. If a result of step 23 is positive, the flow goes to step 24, in which the hologram is outputted. If the result of step 23 is negative, the flow goes to step 25, in which an amplitude of the propagated light field is replaced with a plane wave (or spherical wave) to result in a modified light field, followed by propagating the modified light field from the hologram end to the image end, in step 26, by using the angular spectrum (AS) method.

Figure 3:
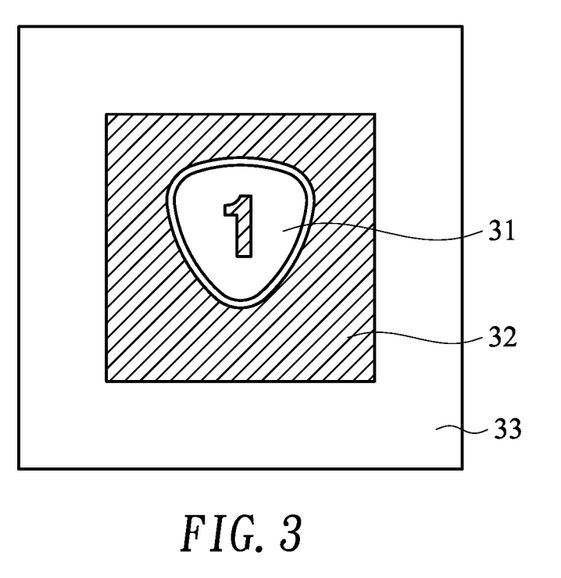
FIG. 3 shows an exemplary image to be displayed which is divided into a signal area, a background area and a noise area.

According to one aspect of the embodiment, in step 27, an amplitude of the modified light field is adaptively replaced according to significance of respective areas of an image, such that amplitudes in different areas may be differently replaced, therefore the method 200 is called "multi-constraints" angular spectrum method. In one embodiment, an image may be divided into three areas: a signal (or main or foreground) area with high significance, a background (or minor) area with low significance, and a noise (or padded) area (surrounding the signal area and the background area). In another embodiment, an image may be divided into two areas: a signal area and a background area. FIG. 3 shows an exemplary image to be displayed which is divided into a signal area 31, a background area 32 and a noise area 33. Specifically, in the signal area, the amplitude of the modified light field is replaced with a weighted objective amplitude having a positive weight; in the background area, the amplitude of the modified light field is weighted with a negative weight; and in the noise area, the amplitude of the modified light field is weighted with a positive weight such that the noise area is capable of taking up stray diffraction, thereby substantially enhancing image quality. Subsequently, the flow goes to step 22 to resume iteration of the multi-constraints angular spectrum method 200.

Figure 4A:
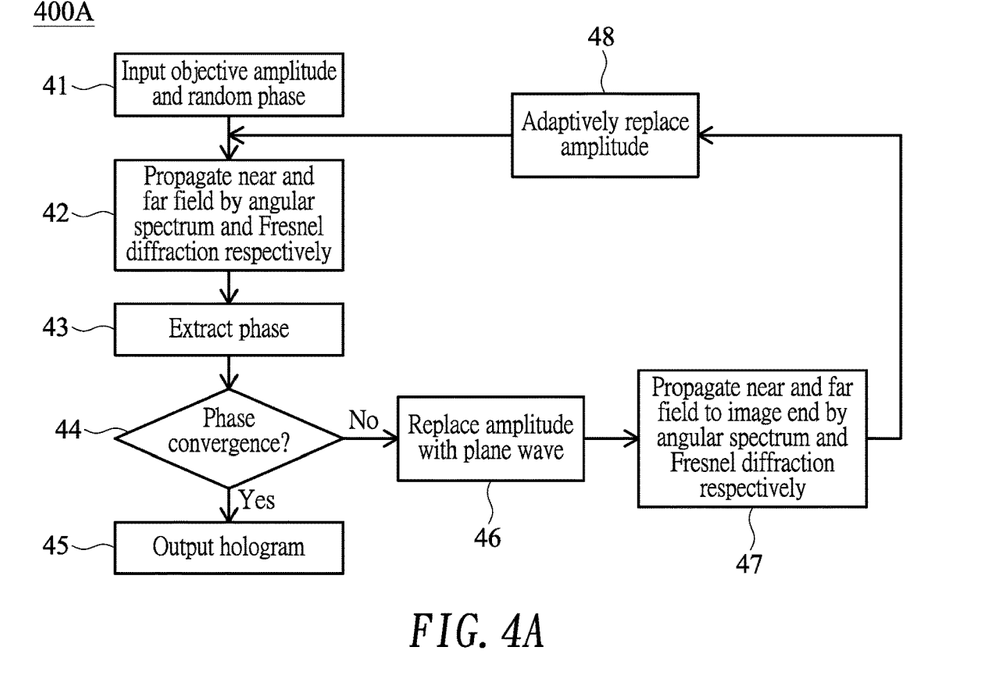
FIG. 4A shows a flow diagram illustrating a hybrid field superposition method according to another embodiment of the present invention adaptable to the 3D holographic display system of FIG. 1.

FIG. 4A shows a flow diagram illustrating a hybrid (or compound) field superposition method 400A according to another embodiment of the present invention adaptable to the 3D holographic display system 100 of FIG. 1. The flow of FIG. 4A is similar to the flow of FIG. 2 with differences to be described in details below.

Figure 5A:
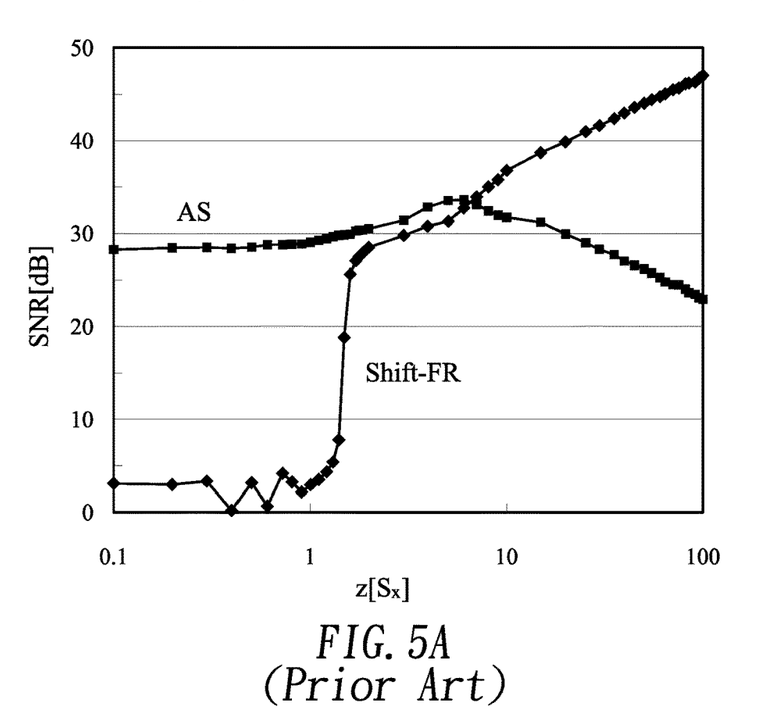
FIG. 5A shows performance of AS method without band-limited and FR method with respect to viewing distance.
Figure 5B:
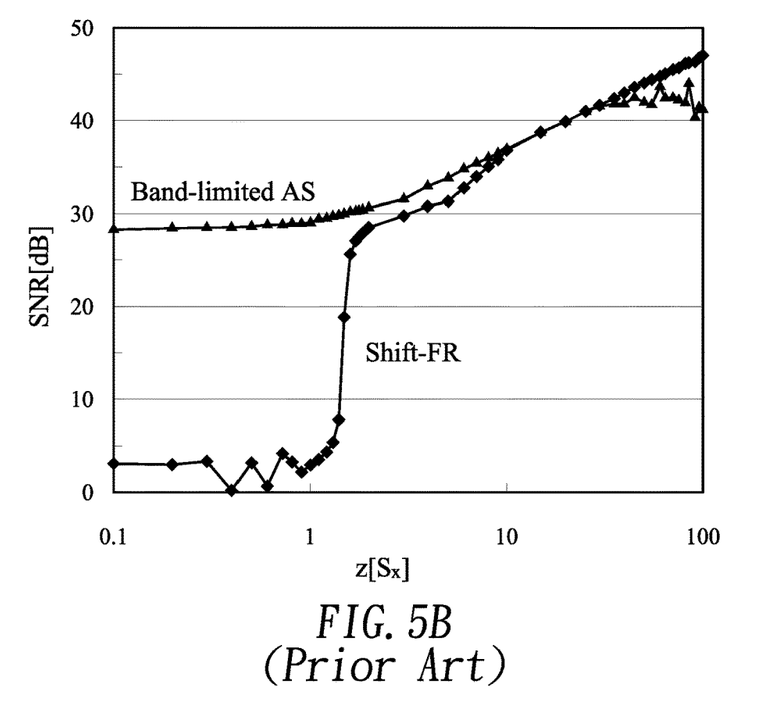
FIG. 5B shows performance of band-limited AS method and FR method with respect to viewing distance.

In step 41, an objective amplitude and a random phase are inputted as a light field at an image end. According to one aspect of the embodiment, in step 42, near-field and far-field light fields are propagated to a hologram end by using an angular spectrum method ("AS method" hereinafter) and a Fresnel diffraction method ("FR method" hereinafter), respectively. Details of the Fresnel diffraction method may be referred to "Shifted Fresnel diffraction for computational holography," entitled to Richard P. Muffoletto et al., published in 2007 Optics Express, the disclosure of which is incorporated herein by reference. FIG. 5A shows performance (in term of signal-to-noise ratio (SNR)) of AS method without band-limited and shift-FR method with respect to viewing distance cited from the aforementioned "Band-Limited Angular Spectrum Method for Numerical Simulation of Free-Space Propagation in Far and Near Fields." As shown in the figure, the AS method performs better in near field (from a viewer), while the FR method performs better in far field (from the viewer). FIG. 5B shows performance (in term of signal-to-noise ratio (SNR)) of band-limited AS method and shift-FR method with respect to viewing distance cited from the aforementioned "Band-Limited Angular Spectrum Method for Numerical Simulation of Free-Space Propagation in Far and Near Fields."

In step 43, the propagated near-field light field (corresponding to the AS method) and the propagated far-field light field (corresponding to the FR method) are added to result in an added light field, from which a phase is extracted. In step 44, it is determined whether a phase of the added light field achieves convergence. If a result of step 44 is positive, the flow goes to step 45, in which the hologram is outputted. If the result of step 44 is negative, the flow goes to step 46, in which amplitudes of the propagated near-field and far-filed light field are replaced with plane waves (or spherical waves) to result in modified near-field and far-field light fields, followed by propagating the modified near-field and far-field light fields from the hologram end to the image end, in step 47, by using the angular spectrum (AS) method and the Fresnel diffraction method, respectively.

In step 48, amplitudes of the modified near-field and far-field light fields are adaptively replaced according to significance of respective areas of an image as in step 27 of FIG. 2. Subsequently, the flow goes to step 42 to resume iteration of the hybrid field superposition method 400. It is noted that, as the angular spectrum (AS) method is utilized for the near field and the Fresnel diffraction method is utilized for the far field, field of view (FOV) of the hologram may be substantially enlarged and aliasing error may be substantially reduced.

Figure 4B:
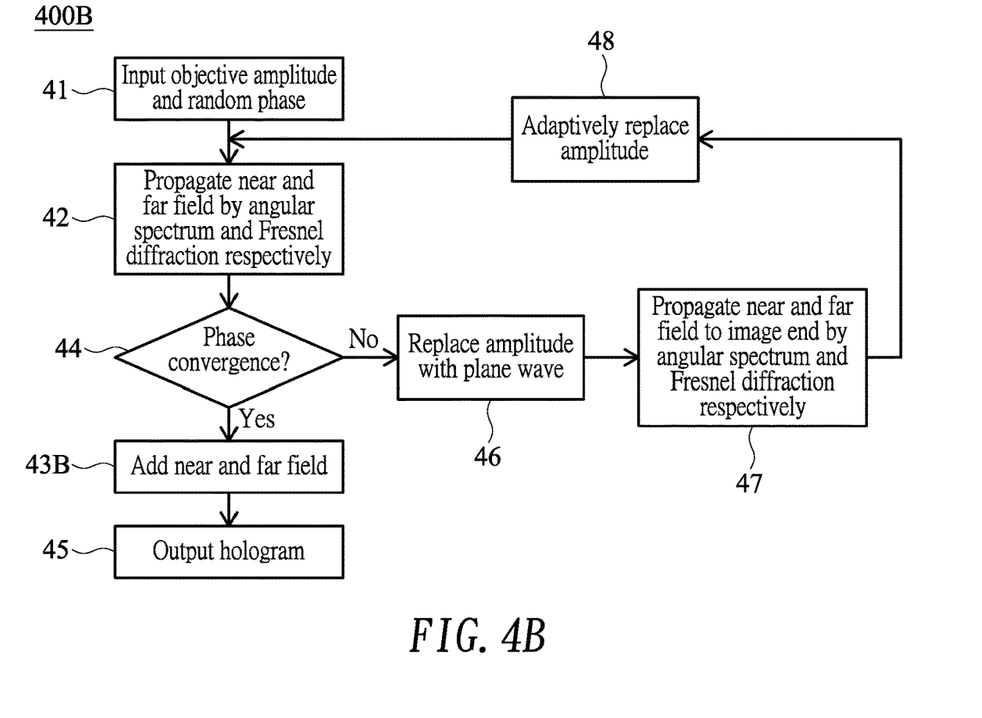
FIG. 4B shows a flow diagram illustrating a hybrid field superposition method according to an alternative embodiment of the present invention adaptable to the 3D holographic display system of FIG. 1.

FIG. 4B shows a flow diagram illustrating a hybrid (or compound) field superposition method 400B according to an alternative embodiment of the present invention adaptable to the 3D holographic display system 100 of FIG. 1. The flow of FIG. 4B is similar to the flow of FIG. 4A with the following difference.

Specifically, in this embodiment, the propagated near-field light field (corresponding to the AS method) and the propagated far-field light field (corresponding to the FR method) are added, in step 43B, only after phase convergence (step 44) is confirmed and before the hologram is outputted (step 45).

Figure 6A:
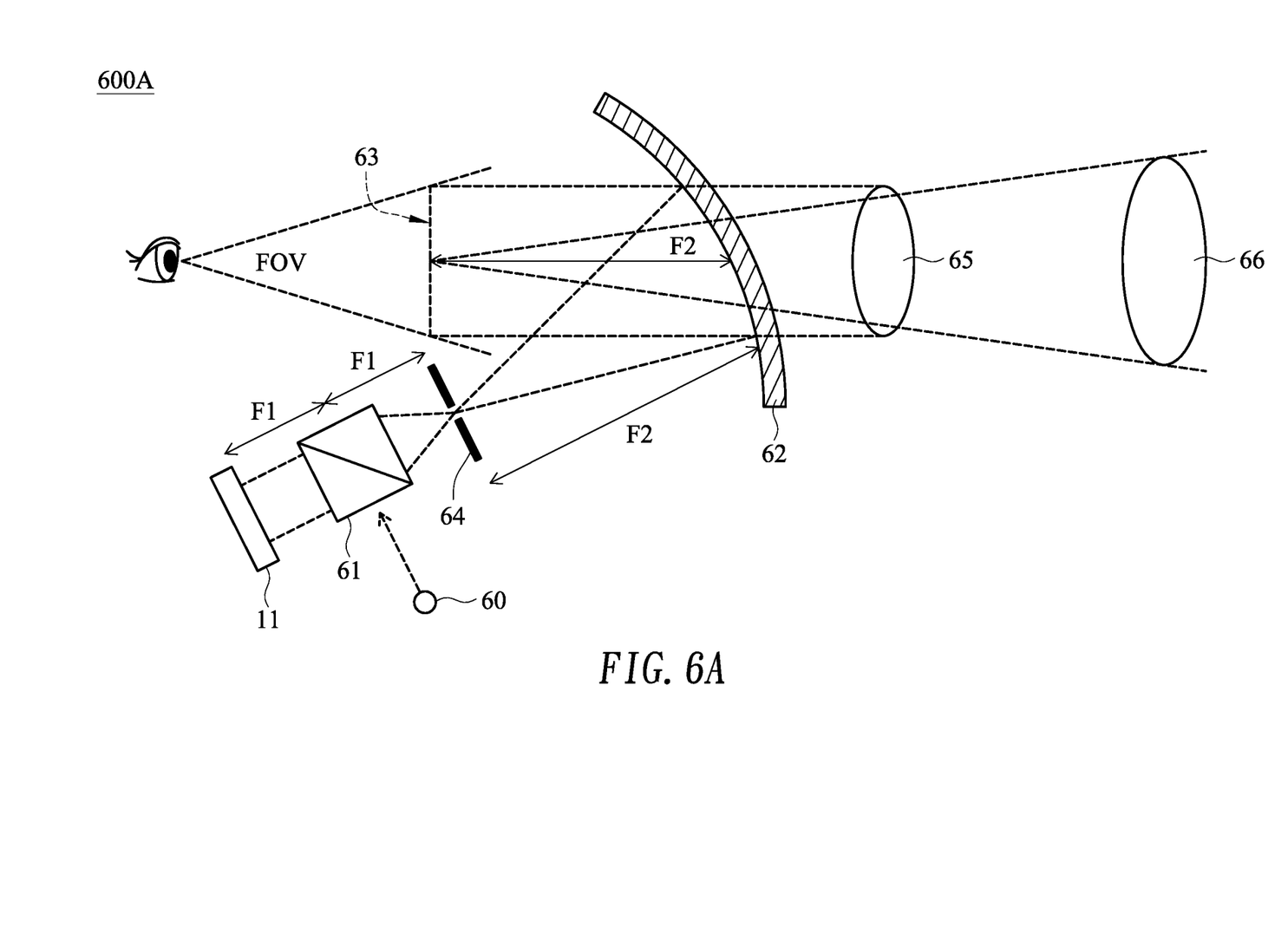
FIG. 6A shows a schematic diagram illustrating an optical setup adaptable to the 3D holographic display system of FIG. 1.

FIG. 6A shows a schematic diagram illustrating an optical setup 600A adaptable to the 3D holographic display system 100 of FIG. 1. Specifically, the optical setup 600A may include a spatial light modulator (SLM) 11, as a projector, configured to generate an image with a form of spatially varying modulation on a light beam, which is provided by a light source 60 via a beam splitter 61. The beam splitter 61 may have a front focal length F1 and a back focal length F1 (that is substantially equal to the front focal length F1) optically coupled to receive the light beam of the SLM 11.

According to one aspect of the embodiment, the optical setup 600A may include a combiner 62 (e.g., transflective coated concave mirror) with a front focal length F2 and a back focal length F2 (that is substantially equal to the front focal length F2), and being disposed before a viewer. The combiner 62 may be coupled to receive the light beam from the beam splitter 61. As shown in FIG. 6A, the beam splitter 61 is disposed between the SLM 11 and the combiner 62, and a real image from the SLM 11 may be focused at a back focal point 63. In one example, the combiner 62 may be a windshield of a vehicle. The optical setup 600A may further include a Fourier plane 64, disposed between the beam splitter 61 and the combiner 62, configured to filter out additional diffraction.

As shown in FIG. 6A, a virtual image 65 generated by the AS method may be displayed in the near field, while another virtual image 66 generated by the FR method may be displayed in the far field.

According to the optical setup 600A (or a 4f combiner system) as set forth above, a size of a generated virtual image may be proportional to a ratio of the (front/back) focal length F2 of the combiner 62 to the (front/back) focal length F1 of the beam splitter 61, and a viewing distance of the generated virtual image (i.e., a distance between the point 63 and the virtual image 65/66) may be proportional to the squared ratio.

Figure 6B:
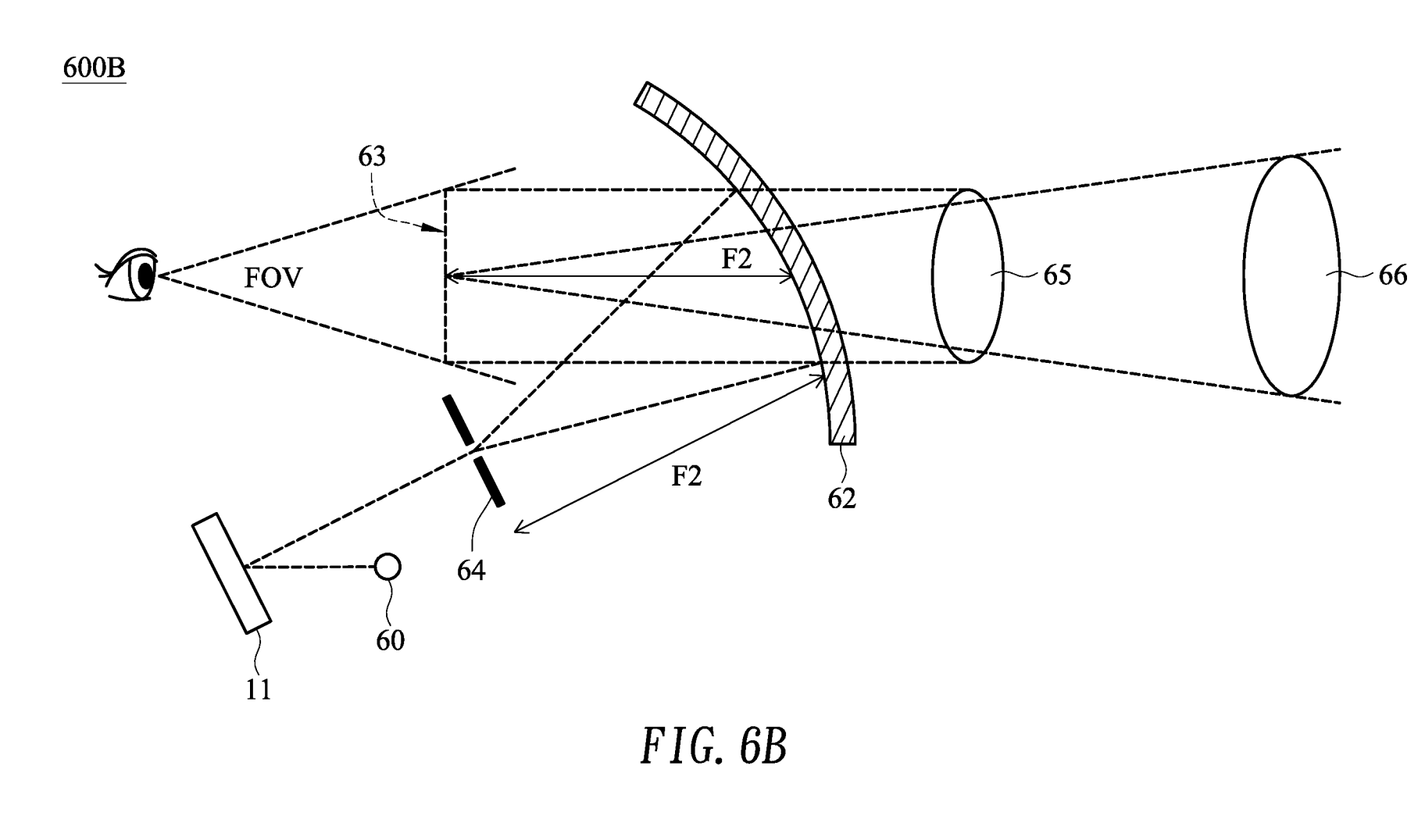
FIG. 6B shows a schematic diagram illustrating an alternative optical setup adaptable to the 3D holographic display system 100 of FIG. 1.

FIG. 6B shows a schematic diagram illustrating an alternative optical setup 600B adaptable to the 3D holographic display system 100 of FIG. 1. In this embodiment, the beam splitter 61 used in the optical setup 600A (FIG. 6A) is omitted, and the spatial light modulator (SLM) 11, as a projector, is configured to generate an image with a form of spatially varying modulation on a light beam, which is provided directly by the light source 60.

Figure 7:
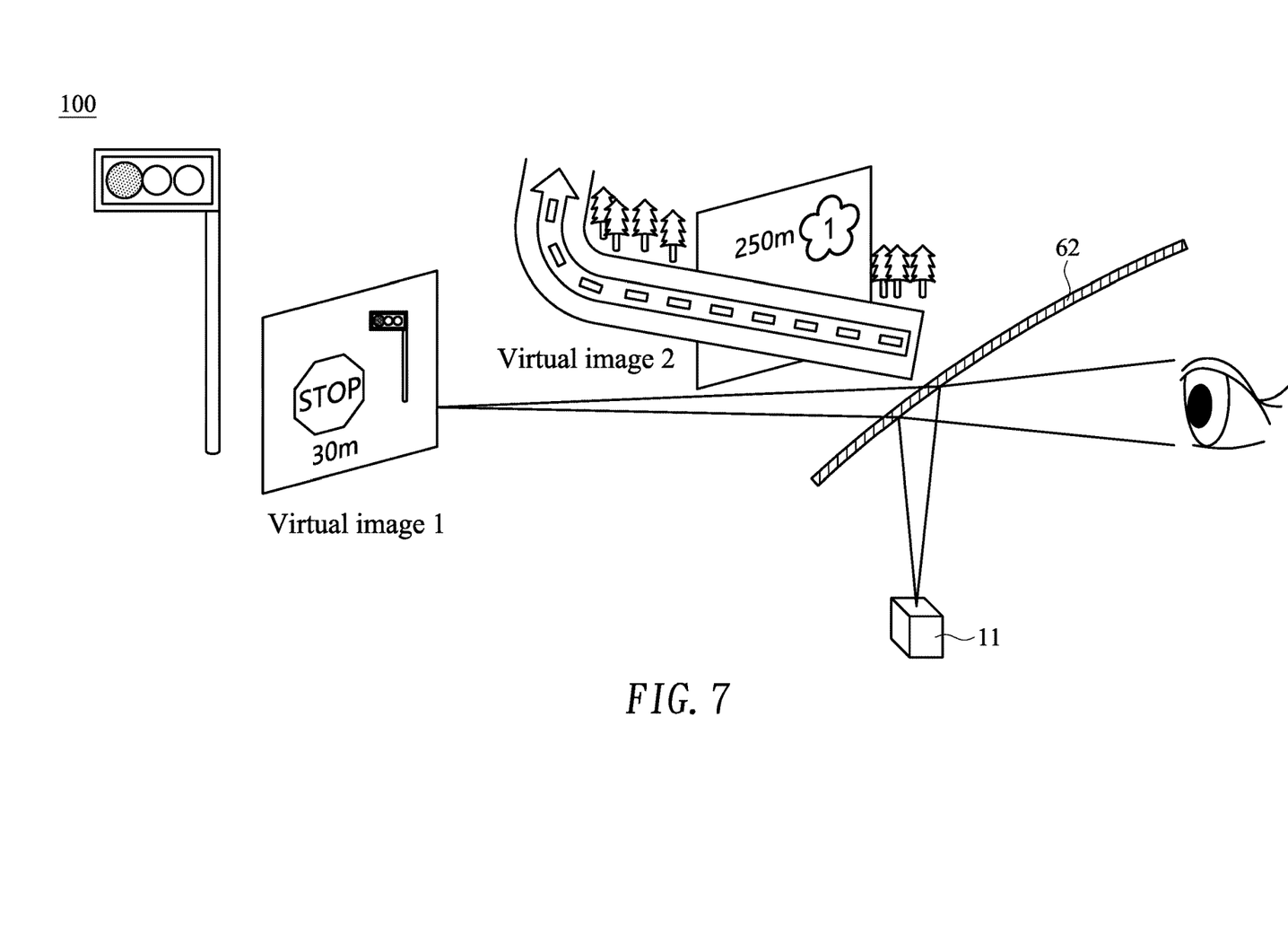
FIG. 7 shows a schematic diagram exemplifying the 3D holographic display system of FIG. 1 applied to a holographic HUD.

FIG. 7 shows a schematic diagram exemplifying the 3D holographic display system 100 of FIG. 1 applied to a holographic HUD that displays virtual image 1 (e.g., traffic signs) far away from the viewer (e.g., driver) for the purpose of not interfering with driver's attention, while displays virtual image 2 (e.g., guided route and information) near the driver.

Although specific embodiments have been illustrated and described, it will be appreciated by those skilled in the art that various modifications may be made without departing from the scope of the present invention, which is intended to be limited solely by the appended claims.

What is claimed is:

1. A three-dimensional (3D) holographic display system, comprising:
   a projector that generates an image with a form of spatially varying modulation on a light beam;
   a holographic processor that performs a holographic method on the image generated by the projector; and
   a memory device that stores holographic data generated in a process of performing the holographic method by the holographic processor;
   wherein an amplitude of a light field is adaptively replaced by the holographic processor according to significance of respective areas of the image;
   wherein the holographic method comprises:
   inputting an objective amplitude and a random phase as a light field at an image end;
   propagating the light field to a hologram end by using an angular spectrum method;
   outputting a hologram if a phase of the propagated light field converges;
   replacing an amplitude of the propagated light field with a plane wave or spherical wave to result in a modified light field if the phase of the propagated light field does not converge;
   propagating the modified light field from the hologram end to the image end by using the angular spectrum method; and
   adaptively replacing an amplitude of the modified light field according to significance of respective areas of the image.

2. The system of claim 1, wherein the projector comprises a spatial light modulator (SLM).

3. The system of claim 2, wherein the SLM comprises a liquid crystal on silicon (LCOS) display.

4. The system of claim 1, wherein the image is divided into following three areas:
   a signal area with high significance;
   a background area with low significance; and
   a noise area that is padded around the signal area and the background area.

5. The system of claim 4, wherein the amplitude in the signal area of the modified light field is replaced with a weighted objective amplitude having a positive weight; the amplitude in the background area of the modified light field is weighted with a negative weight; and the amplitude in the noise area of the modified light field is weighted with a positive weight such that the noise area takes up stray diffraction.

6. The system of claim 1, further comprising:
   a light source providing the light beam directly to the projector or to the projector via a beam splitter; and
   a combiner disposed before a viewer, and coupled to receive the light beam directly from the projector or via the beam splitter.

7. The system of claim 6, wherein the combiner comprises a transflective coated concave mirror.

8. The system of claim 6, wherein the combiner comprises a windshield of a vehicle.

9. A three-dimensional (3D) holographic display system, comprising:
   a projector that generates an image with a form of spatially varying modulation on a light beam;
   a holographic processor that performs a holographic method on the image generated by the projector; and
   a memory device that stores holographic data generated in a process of performing the holographic method by the holographic processor;
   wherein a first virtual image generated by an angular spectrum method is displayed in near field from a viewer, while a second virtual image generated by a Fresnel diffraction method is displayed in far field from the viewer;
   wherein the holographic method comprises:
   inputting an objective amplitude and a random phase as a light field at an image end;
   propagating a near-field light field and a far-field light field to a hologram end by using the angular spectrum method and the Fresnel diffraction method, respectively;
   adding the propagated near-field light field and far-field light field to result in an added light field, from which a phase is extracted;
   outputting a hologram if the extracted phase converges;
   replacing amplitudes of the propagated near-field light field and far-field light field with a plane wave or spherical wave to result in modified near-field light field and far-field light field if the extracted phase does not converge;
   propagating the modified near-field light field and far-field light field from the hologram end to the image end by using the angular spectrum method and the Fresnel diffraction method, respectively; and adaptively replacing amplitudes of the modified near-field light field and far-field light field according to significance of respective areas of the image.

10. The system of claim 9, wherein the projector comprises a spatial light modulator (SLM).

11. The system of claim 10, wherein the SLM comprises a liquid crystal on silicon (LCOS) display.

12. The system of claim 9, further comprising:
 a light source providing the light beam directly to the projector or to the projector via a beam splitter; and
 a combiner disposed before a viewer, and coupled to receive the light beam directly from the projector or via the beam splitter.

13. The system of claim 12, wherein the combiner comprises a transflective coated concave mirror.

14. The system of claim 12, wherein the combiner comprises a windshield of a vehicle.

15. A three-dimensional (3D) holographic display system, comprising:
 a projector that generates an image with a form of spatially varying modulation on a light beam;
 a holographic processor that performs a holographic method on the image generated by the projector; and
 a memory device that stores holographic data generated in a process of performing the holographic method by the holographic processor;
 wherein a first virtual image generated by an angular spectrum method is displayed in near field from a viewer, while a second virtual image generated by a Fresnel diffraction method is displayed in far field from the viewer;
wherein the holographic method comprises:
 inputting an objective amplitude and a random phase as a light field at an image end;
 propagating a near-field light field and a far-field light field to a hologram end by using the angular spectrum method and the Fresnel diffraction method, respectively;
 adding the propagated near-field light field and far-field light field if phases of the propagated near-field light field and far-field light field converge, followed by outputting a hologram;
 replacing amplitudes of the propagated near-field light field and far-field light field with a plane wave or spherical wave to result in modified near-field light field and far-field light field if the phases of the propagated near-field light field and far-field light field do not converge;
 propagating the modified near-field light field and far-field light field from the hologram end to the image end by using the angular spectrum method and the Fresnel diffraction method, respectively; and
 adaptively replacing amplitudes of the modified near-field light field and far-field light field according to significance of respective areas of the image.

* * * * *